United States Patent [19]

Busch et al.

[11] 4,261,842
[45] Apr. 14, 1981

[54] LUBRICANT FOR HIGH TEMPERATURE OPERATIONS

[75] Inventors: Bruce D. Busch, Shakopee; Dennis J. Yeavello, Burnsville, both of Minn.

[73] Assignee: Fremont Industries, Inc., Shakopee, Minn.

[21] Appl. No.: 117,953

[22] Filed: Feb. 4, 1980

[51] Int. Cl.³ .......................... C10M 5/02; C10M 5/04
[52] U.S. Cl. .................................... 252/49.5; 252/49.9
[58] Field of Search ............................ 252/49.5, 49.9

[56] References Cited
U.S. PATENT DOCUMENTS

| | | | |
|---|---|---|---|
| 3,507,790 | 4/1970 | Beerbower et al. | 252/49.5 X |
| 3,507,792 | 4/1970 | Zuraw | 252/49.5 |
| 4,209,414 | 6/1980 | Holgado et al. | 252/49.9 X |

Primary Examiner—Robert V. Hines
Attorney, Agent, or Firm—Orrin M. Haugen; Thomas J. Nikolai

[57] ABSTRACT

A semi-synthetic lubricant for high temperature applications, particularly adapted for use on relatively movable metallic surfaces during the shearing of molten glass, and consisting of an aqueous solution of a formulation comprising a non-drying vegetable oil, such as coconut oil, alkanolamine, the phosphate ester of an ethylene oxide adduct of a linear primary alcohol, an emulsifier, preferably the ethoxylated sorbitol hexaoleate, the fatty nitrogen derivative of distilled coconut oil primary amine, and a wetting agent. The wetting agent is preferably the methyl ester of a 50:50 mixture of methyl palmitate and methyl oleate.

6 Claims, No Drawings

LUBRICANT FOR HIGH TEMPERATURE OPERATIONS

BACKGROUND OF THE INVENTION

The present invention relates generally to an aqueous base lubricant, and more specifically to a lubricant for the high temperature application upon surfaces of a glass shear, or otherwise upon relatively movable metallic surfaces at high temperature. The lubricant contains a substantial quantity of coconut oil together with an alkanolamine, the phosphate ester of a linear primary alcohol, an emulsifier, a primary amine and a wetting agent. The lubricant formulation of the present invention is usable at modest concentrations, hence rendering the material cost effective, and furthermore reducing any unusual load on sewage treatment facilities.

The present invention was specifically designed to accommodate certain unique requirements of the glass industry. In the process of making glass containers, a cylinder of molten glass is extruded and cut by shear blades into a "gob". The molten glass gob then leads into the mold chamber by sliding down a loading chute. The molten glass is highly abrasive to both the shear blades and loading chute. A mixture of water and a lubricant is sprayed onto the shear blades and loading chute to assure a continuation of efficient and precise shear cuts and loading times.

It is necessary therefore for the efficient production of quality glassware, that the following conditions be met:
1. Lubricity must be adequate for the continuous protection of the shear blades and loading chute.
2. Corrosion inhibition is necessary for the protection of all surfaces which come into contact with the aqueous lubricating solution.
3. The lubricant must be composed of non-drying components such that a hard film does not form or is otherwise built-up on shear blades resulting in poor heat transfer and inefficient gob cuts.
4. The lubricant must be able to provide lubrication at minimal concentrations in water to produce maximum cooling benefits.
5. The lubricant must provide good surface wetting characteristics in order to assure efficient heat transfer at the shear blades.
6. The lubricant must be biodegradable since essentially all shear lubrication systems are based upon a once-through, non-recirculating system with the spent lubricant solution entering municipal water treatment facilities.

Since the temperature of the molten glass in contact with the shear blades is normally in the vicinity of 2000° F., cooling of the shear blades is a primary concern. Generally speaking, the lubricants best suited for cooling efficiency are the water-based lubricants.

Since lubrication of the shear blades and loading chute is necessary for the production of high quality glassware and since a lubricating film must be present a high water-to-lubricant dilution, the lubricant must possess excellent lubrication properties. Generally speaking, the compounds offering the best lubricity are oil-based lubricants.

The present invention combines the best properties of soluble oil lubricants and water-based lubricants. In other words, the invention is considered to be a hybrid of oil-based and synthetic lubricants; thus a semi-synthetic. The definition of semi-synthetic is essentially a compound containing oil in which the oil component comprises less than 50% by weight of the total non-aqueous component fractions of the formulation. Water, therefore, may be present in a semi-synthetic product but normally is not considered when computing the percentage of oil present in the formulation.

The importance of lower levels of oil can be appreciated by considering the problems of pollution in a once-through system wherein the spent lubricant is discharged into the environment. While animal and vegetable oils are considered biodegradable, their BOD values are high enough to warrant efforts to decrease the amount discharged into the environment or into municipal sewage systems. Often municipalities impose surcharges on the sewage treatment rates of a manufacturing or commercial facility dependent on the BOD or COD of their effluent.

The present invention therefore provides a lubricant having lubricating properties essentially equal to those of the soluble oil products at equal or greater dilutions while reducing the amount of oil used in the process.

The primary lubricant component of the invention is the non-drying vegetable oil, with coconut oil being preferred. The alkanolamine, methyl ester and phosphate ester are lubricant additives. The function of the lubricant additives is to lower the percentage of oil necessary to maintain efficient lubrication, with the methyl ester functioning as a primary wetting agent. Additionally, the methyl ester provides secondary emulsion stability. The emulsifier system is composed of an ethyoxylated sorbitol hexaoleate. Secondary emulsion stability is also provided by the primary amine and phosphate ester. Corrosion inhibition is afforded to the product by the alkanolamine, primary amine and phosphate ester. Bacterial degradation and rancidity are inhibited by the primary amine.

SUMMARY OF THE INVENTION

A primary object of this invention is to provide an environmentally compatible lubricant useful at high dilution rates in aqueous solutions for the shear blades and loading chute of glass container producing machines, with the formulation including an oil, an emulsification system, lubrication additives and corrosion inhibitors.

A further object of the invention is the inhibition of corrosion on those surfaces contacted by the lubricant-water solution.

A further object of the invention is the virtual prevention or reduction of bacterial degradation of the concentrated product while allowing for biodegradation in the working solution at lower concentration levels.

A further object of the invention is the improvement of cooling of the shear blades through wetting by providing a water interface with inclusion of a wetting agent.

A further object of the invention is the prevention of the build-up of a hard or tacky film formation on surfaces contacted by the lubricant through the incorporation of non-drying components and an efficient emulsifier system.

Other and further objects of the present invention will become apparent to those skilled in the art upon a study of the following specification and appended claims.

DESCRIPTION OF THE PREFERRED EMBODIMENT

In order to best disclose the properties of the preferred embodiment, the following specific formulation is provided:

EXAMPLE 1

| Component | Percent by Weight |
| --- | --- |
| Non-drying vegetable oil (refined coconut oil) | 15.00 |
| Alkanolamine (triethanol amine, widely commercially available) | 7.00 |
| Phosphate ester (the reaction product of the ethylene oxide adduct of a linear primary alfol alcohol blend having the following structural formula: $CH_3(CH_2)_X CH_2 (O CH_2 CH_2)_n OH$ where the value of "X" is approximately 11 and "n" is 3. This material is commercially available from Continental Oil Company of New York City, New York under the designation "Alfonic 1412-40", and polyphosphoric acid 115% widely commercially available) | 3.00 |
| Emulsifier (ethoxylated sorbital hexaoleate available commercially from Emery Industries, Inc. of Cincinnati, Ohio under the trade name "Trylox 6747") | 6.00 |
| Primary amine (the fatty nitrogen derivative of distilled coconut oil primary amine, available commercially under the designation "Kemamine P-650D" from Humko Products, Division of Kraftco Corporation, Memphis, Tennessee) | 2.00 |
| Wetting agent (the methyl ester mixture of a 50:50 methyl palmitate and methyl oleate available commercially as "Stepan C65" from Stepan Chemical Company of Northfield, Illinois) | 4.00 |
| Water | balance |

In order to provide a variety of related formulations which perform the functions of the formulation of Example 1, the following table is presented as related to Example 1 wherein the useful ranges of the components is set forth hereinbelow:

TABLE 1

| Component | Percent by Weight |
| --- | --- |
| Non-drying vegetable oil (preferably refined coconut oil) | 5.0 to 40.0 |
| Alkanolamine (preferably triethanolamine widely commercially available) | 1.0 to 20.0 |
| Phosphate ester (the reaction product of the ethylene oxide adduct of a linear primary alfol alcohol blend having the following structural formula: $CH_3 (CH_2)_X CH_2 (O CH_2 CH_2)_n OH$ where the value of "X" is approximately 11 and "n" is 3. This material is commercially available from Continental Oil Company of New York City, New York under the designation "Alfonic 1412-40", and polyphosphoric acid 115% widely commercially available) | 0.5 to 10.0 |
| Emulsifier (preferably ethoxylated sorbitol hexaoleate available commercially from Emery Industries, Inc. of Cincinnati, Ohio under the trade name "Trylox 6747") | 2.0 to 15.0 |
| Wetting agent (preferably the methyl ester mixture of a 50:50 mixture of methyl palmitate and methyl oleate available commercially as "Stepan C-65" from Stepan Chemical Company of Northfield, Illinois) | 0.5 to 10.0 |
| Primary amine (preferably the fatty nitrogen derivative of distilled coconut oil, primary amine, available commercially as "Kemamine P-650D" from Humko Products, Division of Kraftco Corporation of Memphis, Tenn.) | 0.1 to 8.0 |
| Water | Balance |

The working solution is prepared by the addition of the present invention to water while mixing. The resulting emulsion is stable in hard, soft or distilled water for at least two days without further agitation. With occasional agitation, the emulsion is stable essentially indefinitely. The preferred range of dilution is 1 part of the formulation of Example 1 to from 50 to 800 parts of water. Optimum dilution is generally 1 part the formulation of Example 1 to 500 parts of water. The invention has been found to exhibit the characteristics described above when used in the afore-mentioned dilution ratios.

DISCUSSION OF THE SELECTED COMPONENTS

Each component of the formulation was selected to provided specific functions in the working solution. These components and advantages are discussed below.

(A) Refined Coconut Oil

This oil was chosen as the main lubricating agent because of its excellent lubricating properties under the intended application, as well as its commercial availability, low odor, biodegradability and non-drying characteristics.

(B) Phosphate Ester

Several phosphate esters of linear, primary alcohols which are commercially available have been found to be effective in this invention. The preferred phosphate ester is prepared by following the procedure outlined below.

Synthesis of Preferred Phosphate Ester

The raw materials for the reactant mixture are:

(i) An ethylene oxide adduct of a linear, primary alfol alcohol blend having the structural formula:

$$CH_3(CH_2)_XCH_2(OCH_2CH_2)_nOH$$

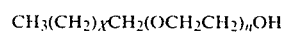

where the value of "X" is approximately 11 and "n" is 3 (commercially available).

(ii) Polyphosphoric acid 115% (readily commercially available).

The phosphate ester is composed of 79.68% by weight of the alfol alcohol ethyoxylate and 20.32% by weight of polyphosphoric acid 115%.

The alfol alcohol ethoxylate is charged to a clean, dry, stainless steel mixing tank equipped with a mixer. The temperature is brought to 120° F.

The polyphosphoric acid 115% is added to the mixing tank with agitation and the mixture is brought to a temperature of 220° F. and allowed to react for four hours at that temperature. The reacted material is subsequently cooled and checked for quality. The pH of the phosphate ester is approximately 2.1.

The phosphate ester has been found to provide extreme pressure lubrication in the overall formulation and also aids in emulsion stabilization and corrosion inhibition.

(C) Alkanolamine

The preferred alkanolamine is triethanolamine although diethanolamine is also effective in the formulation. The alkanolamine is used to adjust the pH of the formulation between 7.0 and 10.0. The alkanolamine also aids in corrosion inhibition and surface boundary lubrication.

(D) Methyl Ester

The preferred methyl ester is one which is a mixture of 50% by weight methyl palmitate and 50% by weight methyl oleate. The methyl ester may comprise methyl palmitate or methyl oleate, as well as the preferred mixture set forth. This component is an efficient wetting agent and has been shown to provide emulsion stabilization and lubrication characteristics in the formulation.

(E) Primary Amine

The preferred primary amine is the fatty nitrogen derivative of distilled coconut oil primary amine. This material offers corrosion inhibition as well as emulsion stabilization in the formulation. The component also inhibits bacterial degradation of the concentrated formulated product.

(F) Emulsifier

The preferred emulsifier is ethyoxylated sorbitol hexaoleate.

Preparation of the Invention

The present invention is prepared by premixing the oil soluble components until a uniform mixture is formed. All components with the exception of water are considered oil soluble. When a non-aqueous concentrate is desired, the procedure is complete at this point. If a preformed emulsion is the desired finished product, the water is then added, slowly, with agitation, to the oil soluble components. This procedure provides an inverted, oil-in-water emulsion which is stable in hard, soft or distilled water.

Description of the Emulsion Formed

The initial few percent of water are readily emulsified by the oil components forming a water-in-oil emulsion. Upon the further addition of water, the emulsion inverts, becoming an oil-in-water emulsion. Inverted emulsions are generally considered to be more stable than non-inverted emulsions.

We claim:

1. A lubricant for application upon relatively movable metallic surfaces at high temperature and consisting of a water-compatible formulation comprising:

| Component | Percent by Weight |
| --- | --- |
| (a) non-drying vegetable oil | 5.0 to 40.0 |
| (b) alkanolamine | 1.0 to 20.0 |
| (c) the phosphate ester reaction product of an ethylene oxide adduct of a linear primary alfol alcohol blend having the structural formula: $CH_3 (CH_2)_X CH_2 (O CH_2 CH_2)_n OH$ wherein the value of "X" is approximately 11 and "n" is 3 and polyphosphoric acid | 0.5 to 10.0 |
| (d) ethoxylated sorbitol hexaoleate | 2.0 to 15.0 |
| (e) a methyl ester selected from the group consisting of methyl palmitate and methyl oleate, and mixtures thereof | 0.5 to 10.0 |
| (f) the fatty nitrogen derivative of distilled coconut oil | 0.1 to 8.0 |

2. The lubricant formulation of claim 1 wherein the non-drying vegetable oil is coconut oil.

3. The lubricant formulation of either claim 1 or 2 wherein said alkanolamine is triethanolamine.

4. The lubricant formulation of either claim 1 or 2 wherein said methyl ester is a 50:50 mixture of methyl palmitate and methyl oleate.

5. The lubricant formulation of either claim 1 or 2 wherein said formulation is present in an aqueous working solution containing 1 part of said formulation to from 50 to 800 parts of water.

6. The method of lubricating relatively movable metallic surfaces operating at high temperatures which comprises the steps of:

(a) applying an aqueous mixture of a formulation comprising:

| Component | Percent by Weight |
| --- | --- |
| (1) non-drying vegetable oil | 5.0 to 40.0 |
| (2) alkanolamine | 1.0 to 20.0 |
| (3) the phosphate ester reaction product of an ethylene oxide adduct of a linear primary alfol alcohol blend having the structural formula: $CH_3 (CH_2)_X CH_2 (O CH_2 CH_2)_n OH$ wherein the value of "X" is approximately 11 and "n" is 3 and polyphosphoric acid | 0.5 to 10.0 |
| (4) ethoxylated sorbitol hexaoleate | 2.0 to 15.0 |
| (5) a methyl ester selected from the group consisting of methyl palmitate and methyl oleate, and mixtures thereof | 0.5 to 10.0 |
| (6) the fatty nitrogen derivative of distilled coconut oil | 0.1 to 8.0 |

(b) diluting said formulation to a range of 1 part of said formulation to from 50 to 800 parts of water; and (c) applying said aqueous solution to the surfaces of said relatively movable metallic surfaces.

* * * * *